UNITED STATES PATENT OFFICE.

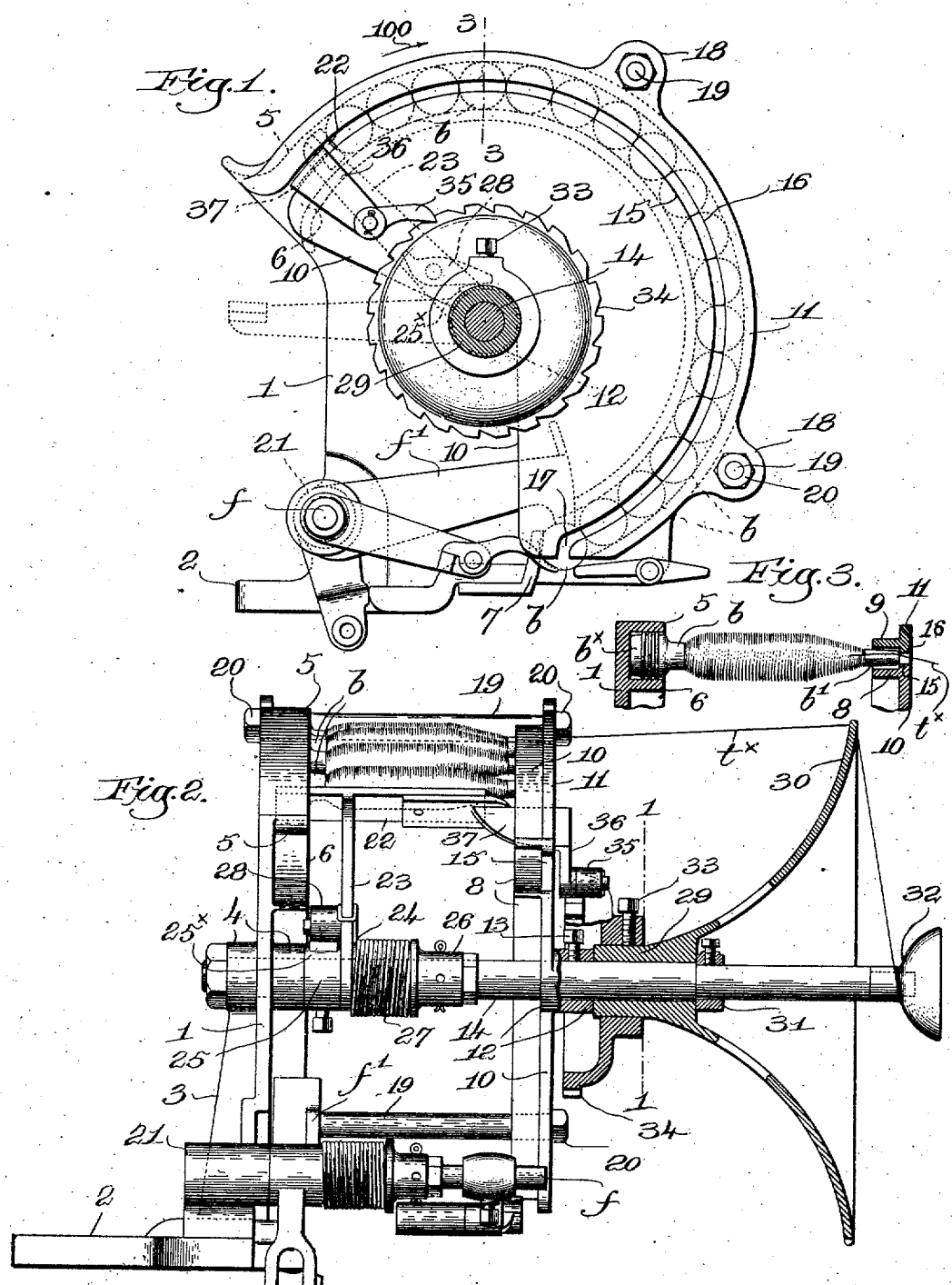

GEORGE O. DRAPER, OF HOPEDALE, MASSACHUSETTS, ASSIGNOR TO DRAPER COMPANY, OF HOPEDALE, MASSACHUSETTS, A CORPORATION OF MAINE.

FILLING-REPLENISHING MECHANISM FOR LOOMS.

No. 884,723.

Specification of Letters Patent.

Patented April 14, 1908.

Application filed October 28, 1907. Serial No. 399,488.

*To all whom it may concern:*

Be it known that I, GEORGE O. DRAPER, a citizen of the United States, and resident of Hopedale, county of Worcester, State of Massachusetts, have invented an Improvement in Filling-Replenishing Mechanism for Looms, of which the following description, in connection with the accompanying drawings, is a specification, like letters on the drawing representing like parts.

This invention has for its object the production of novel mechanism for replenishing automatically the filling in the running shuttle of a loom, and the present invention has more especial reference to the magazine, hopper or feeder in which the reserve supply of filling-carriers or bobbins is contained.

In United States patent No. 529940 granted to Northrop on November 27, 1894, the filling-carriers are separately sustained in a movable feeder, the latter being moved intermittingly to thereby present the filling-carriers one by one into position to be transferred to the shuttle when replenishment of the filling thereof is required.

Herein I have devised a feeder in the form of a chute, to contain a series of filling-carriers the one engaging the other and being movable along the chute to the point from which they are removed singly by the transferring device.

The chute sustains and guides the filling-carriers, and I have also provided a follower to act upon the rearmost one of the series and insure the proper intermittent feeding or advance movement after the leading carrier has been transferred.

The various novel features of my invention will be fully described in the subjoined specification and particularly pointed out in the following claims.

Figure 1 is a side elevation of that portion of the replenishing mechanism embodying my present invention which is shown at the left of the line 1—1, Fig. 2, the filling-end guide being omitted to more clearly illustrate the other portions of the structure; Fig. 2 is a front elevation and partial section of the replenishing mechanism, the filling-end guide being shown in vertical section through its center; Fig. 3 is a sectional detail through the feeder or chute on the line 3—3, Fig. 1, and showing a filling-carrier supported therein.

Referring to Figs. 1 and 2, an upright plate 1 forms part of a casting shaped to present a base 2 adapted to be attached to the breast beam of a loom at the replenishing side thereof, the plate being suitably stiffened by a web 3, Fig. 2, and having a cylindrical bearing hub or boss 4 for a purpose to be described.

The plate 1 is provided on its outer face with two parallel and circularly curved flanges 5 and 6 which form a chute or channel for the butts $b^\times$ of a series of filling-carriers or bobbins $b$, and viewing Fig. 1, in which the loaded filling-carriers are indicated by dotted circles, it will be seen that the effective length of the chute is somewhat greater than 180°.

The upper ends of the flanges 5 and 6 are preferably flared, as shown in dotted lines Fig. 1, and at the lower ends of the chute I have provided an abutment 7, Fig. 1, to form a stop for the leading filling-carrier of the series, this abutment positioning such filling-carrier for transfer from the feeder to the shuttle, in the manner commonly practiced in looms of the Northrop type.

The tips $b'$ of the filling-carriers are supported and guided in an opposite chute also circularly curved, and formed by circularly curved flanges 8 and 9, see Fig. 3, formed respectively on an upright plate 10 and a segmental plate 11, the plate 10 having a hub 12, Fig. 2, fixedly secured as by a set-screw 13 upon a horizontal elongated shaft 14, rigidly secured in the hub-like bearing 4 of the plate 1.

The plates 1 and 10 are in parallelism, and the circularly curved chutes for the butts and tips respectively of the filling-carriers are concentric with the shaft 14 and opposite each other, as will be manifest.

The edge of the plate 10 adjacent its flange is circularly curved at 15, see Fig. 1, and the adjacent edge 16 of the segment 11 is also circularly curved and parallel thereto, for substantially its entire length, the space between the edges 15 and 16 forming a passage for the filling-ends at $t^\times$, Fig. 3, which are led from the tips of the filling-carriers in the chute-like feeder. At the lower end this curved passage is downturned as at 17, Fig. 1, to permit the ready passage therethrough of the filling-end of the carrier which is transferred.

The segment 11 is herein shown as provided with ears 18 through which are extended shouldered studs 19, said studs being also extended through similar ears on the plate 1, the studs being clamped to the two plates by suitable bolts 20, so that the segment is securely held in its operative position.

To load the chute, the filling-carriers are inserted from its upper end one after the other, and pushed forward until the greater part of the chute is filled, as indicated by the circles $b$, the leading filling-carrier resting against the abutment 7 in position to be transferred by the transferrer $f, f'$. This transferrer is substantially the same as in the Northrop patent hereinbefore referred to, and is mounted to rock on a stud $f$ held rigidly in a bearing 21 forming a part of the base 2, the operative movement of the transferrer being effected by mechanism usual in the Northrop type of loom and being so well known as to need no illustration or further description in this application.

I have provided a follower 22 to travel in a circular path coincident with the curve of the chute, to engage the rearmost filling-carrier of the series and to assist in moving the filling-carriers forward after each operation of the transferring mechanism, to thereby insure the proper positioning of the leading carrier in readiness for transfer.

The follower is mounted upon an angularly movable arm 23, having its hub 24 mounted to turn on the shaft 14 between fixed collars 25 and 26, an actuating spring 27 secured at one end to the collar 26 being shown in Fig. 2 as coiled around the hub 24 and at its other end attached to the arm 23, the winding of the spring being such that it always tends to move the follower in the direction of the arrow 100, Fig. 1, maintaining the follower pressed against the rearmost filling-carrier of the series.

When the chute is to be loaded it is of course necessary to withdraw the follower from its operating position within the chute, and I have provided the collar 25 with a tooth $25^{\times}$, to be engaged by a pawl 28 pivotally mounted on the arm 23 when the latter is moved to the left, viewing Fig. 1, far enough to bring the pawl and the tooth into engagement. At such time the follower will be held in substantially the dotted line position shown in Fig. 1, permitting the operative to readily insert the filling-carriers into the open upper end of the chute.

After the chute has been filled, the operative disengages the pawl 28 from the tooth $25^{\times}$ and permits the spring 27 to swing the follower inward to operative position.

The hub 29 of a filling-end guide 30 is rotatably mounted on the shaft 14 at the outer end of the filling-feeder, between the hub 12 and a collar 31, fast on the shaft, the guide 30 being shown as a bell-like disk having a notched periphery, the filling-ends $t^{\times}$ being led through the passage in the outer end of the tip-supporting chute and thence over the periphery of the guide 30 and down to a headed stud 32, see Fig. 2, constituting a holder for the ends.

The holder is stationary but the guide rotates in unison with the follower 22, and herein the rotative movement of the guide is effected by or through the follower. To that end I have attached to the hub 29 of the guide by a set screw 33 a ratchet 34 adapted to be engaged by a pawl 35 mounted on a pawl-carrier 36 traveling adjacent the outer face of the plate 10 and having its upper end 37 inturned, extended through the filling-end passage or slot and fixedly attached to the follower 22, as shown in Figs. 1 and 2.

When the follower is moved forward in the direction of the arrow 100, Fig. 1, by the actuating spring 27, the carrier 36 will of course be moved similarly therewith, and the coöperation of the pawl 35 and ratchet 34 effects the unison rotative movement of the filling-end guide 30.

It will be manifest that the filling-ends will thus travel in a circular path with the carriers from the tips of which they lead to the guide 30, and are kept always at the proper relative distance from each other, and maintain the same relative position to their own carriers throughout the movement of the latter from the inlet to the outer end of the chute or feeder.

The curved slot or passage for the filling-ends is of less width than the diameter of the tip of a filling-carrier, as will be seen from an inspection of Fig. 3, so that there is no danger of the tips catching in the slot.

Referring to Fig. 1, it will be seen that I am enabled to utilize almost the entire length of the chute to contain a series of filling-carriers or bobbins, and while it is necessary to employ the follower or an equivalent device to retain in place all of those filling-carriers at the left of the vertical center of the chute, viewing Fig. 1, I prefer to employ the follower at all times, as by its pressure upon the rearmost carrier of the series, it insures the forward movement of all of the carriers from time to time, so that the leading carrier will always be in position to be transferred to the shuttle when replenishment of filling is called for.

The structure is simple, the moving parts are few, and easily constructed, and there is practically no liability of the parts of the apparatus getting out of order.

In Fig. 2, the filling-carriers in the upper part of the chute are shown, but I have omitted them from the lower portion of the chute in order to avoid confusion in the drawing.

My invention is not restricted to the precise construction and arrangement herein shown and described, as the same may be modified or rearranged in different particulars by those skilled in the art without departing from the spirit and scope of my invention, substantially as set forth in the claims appended hereto.

Having fully described my invention, what I claim as new and desire to secure by Letters Patent is:—

1. A filling-feeder comprising two opposite and separate chutes to receive the butts and tips, respectively, of a series of filling-carriers, the tip-receiving chute having a continuous passage in its outer end for the filling-ends, and a spring-actuated follower movable in the chutes, to assist in feeding them forward into position to be transferred.

2. A filling-feeder comprising a circularly-curved chute to receive a series of filling-carriers, a follower to engage the rearmost one of the series, means to move the follower forward in a circular path, and a filling-end guide movable in unison with the follower.

3. A circularly-curved chute to contain a series of filling-carriers, combined with a circularly-movable follower to act upon the rearmost filling-carrier in the chute and assist in moving the series forward.

4. The combination, with a stationary, circularly-curved chute to receive the butts and tips of a series of filling-carriers, of a spring-actuated follower to engage the rearmost carrier and fulcrumed co-axially with the chute.

5. A circularly-curved chute to contain a series of filling-carriers, combined with a circularly-movable follower to act upon the rearmost filling-carrier in the chute and assist in moving the series forward, and a spring operatively connected with and to effect the movement of said follower and maintain it in engagement with the rearmost filling-carrier.

6. The combination, with a stationary, circularly-curved chute to receive the butts and tips of a series of filling-carriers, of a spring-actuated follower to engage the rearmost carrier and fulcrumed co-axially with the chute, and a manually-controlled detent to hold the follower retracted when loading the chute.

7. The combination, with a stationary chute to contain a series of filling-carriers, of an intermittingly-moving guide for the filling-ends.

8. The combination, with a stationary chute to contain a series of filling-carriers movable therein into position to be transferred, a guide for the filling-ends, and means to move it in unison with the advance of the filling-carriers.

9. The combination, with a stationary chute to contain a series of filling-carriers, of a follower to insure the forward movement of the carriers into position to be transferred, and a filling-end guide operatively connected with and moved by said follower.

10. The combination, with opposite, circularly-curved chutes for the butts and tips, respectively, of a series of filling-carriers, the tip-receiving chute having a continuous slot for the filling-ends, of a fixed shaft at the center of the chutes, a spring-actuated follower rotatably mounted on the shaft and adapted to press against the rearmost carrier of the series, a circular filling-end guide rotatable on the shaft at the outer end of the chutes, a connection between the follower and guide, to turn the latter in unison with the movement of the former, and a filling-end holder fast on the shaft beyond the guide.

11. The combination, with opposite, circularly-curved chutes for the butts and tips, respectively, of a series of filling-carriers, the tip-receiving chute having a continuous slot for the filling-ends, of a fixed shaft at the center of the chutes, a spring-actuated follower rotatably mounted on the shaft and adapted to press against the rearmost carrier of the series, a circular filling-end guide rotatable on the shaft at the outer end of the chutes, and having an attached ratchet, a pawl to cooperate therewith, a pawl-carrier attached to the follower and extended through the slot in the tip-chute, engagement of the pawl and ratchet effecting movement of the guide in unison with the follower, and a holder to which the filling-ends are secured beyond the guide.

12. The combination with a stationary, circularly-curved feeder adapted to contain a series of filling-carriers, a follower fulcrumed co-axially with the feeder and adapted to press against the rearmost filling-carrier of the series, an actuator for the follower, a rotatable guide for the filling-ends, co-axial with the follower and operatively connected therewith, to be moved in unison therewith, and a stationary holder for the filling-ends, beyond the guide.

13. The combination with a stationary, circularly-curved feeder adapted to contain a series of filling-carriers, a follower fulcrumed co-axially with the feeder and adapted to press against the rearmost filling-carrier of the series, an actuator for the follower, a rotatable guide for the filling-ends, co-axial with the follower and operatively connected therewith, to be moved in unison therewith, and a manually-controlled detent to hold the follower retracted from the inlet end of the feeder, to permit the latter to be loaded.

In testimony whereof, I have signed my name to this specification, in the presence of two subscribing witnesses.

GEORGE O. DRAPER.

Witnesses:
E. D. BANCROFT,
ERNEST W. WOOD.